United States Patent [19]

Schosek

[11] Patent Number: 4,492,274
[45] Date of Patent: Jan. 8, 1985

[54] LIGHT WEIGHT UNDERGROUND PIPE OR CABLE INSTALLING DEVICE

[75] Inventor: William O. Schosek, North Fort Myers, Fla.

[73] Assignee: Elephant Industries, Inc., North Fort Myers, Fla.

[21] Appl. No.: 404,390

[22] Filed: Aug. 2, 1982

[51] Int. Cl.³ .............................................. E21B 7/26
[52] U.S. Cl. .................................... 175/19; 175/203; 405/184; 254/29 R
[58] Field of Search ...................... 175/19, 53, 62, 203; 405/154, 184, 272, 273; 254/29 R

[56] References Cited

U.S. PATENT DOCUMENTS

| | | | |
|---|---|---|---|
| 2,656,148 | 10/1953 | Fladung | 254/29 R |
| 3,113,628 | 12/1983 | Orcutt | 405/184 |
| 4,247,081 | 1/1981 | Schosek | 254/29 R |
| 4,247,222 | 1/1981 | Schosek | 405/184 |
| 4,251,058 | 2/1981 | Schosek | 254/29 R |
| 4,274,758 | 6/1981 | Schosek | 405/184 |
| 4,306,626 | 12/1981 | Duke | 175/53 |

Primary Examiner—James A. Leppink
Assistant Examiner—Mark J. DelSignore
Attorney, Agent, or Firm—Alfred E. Wilson

[57] ABSTRACT

This invention pertains to a light weight underground pipe or cable installing device adapted for use in a narrow and deep operating trench. More particularly this underground pipe installing device employs a pair of laterally movable gates positioned adjacent the bottom of the operating trench where the earth is more solid to securely clamp the device in the operating trench to enable it to withstand the forces exerted as the actuating rod is forced through the earth from the so-called operating trench to the target trench.

To accommodate the laterally movable gates positioned adjacent the bottom of the narrow pipe installing device, a pair of top operated double-acting rod clamping jaws, operated by a hydraulic cylinder positioned above the actuating rod are employed.

1 Claim, 7 Drawing Figures

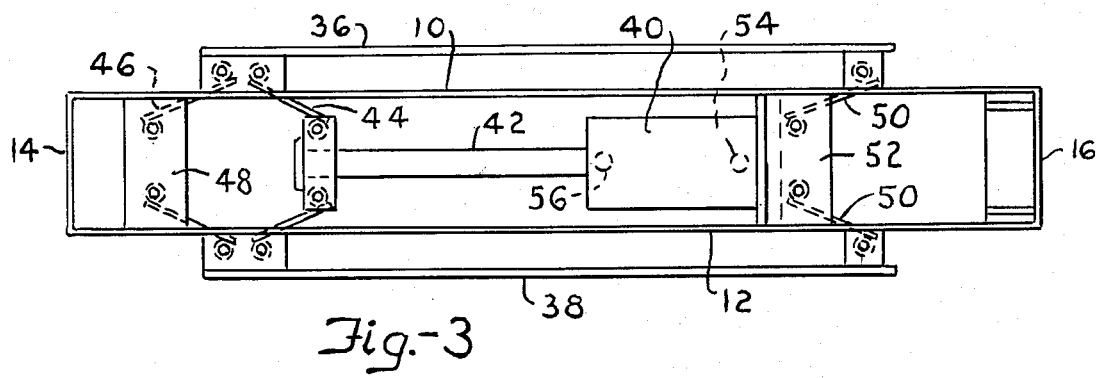
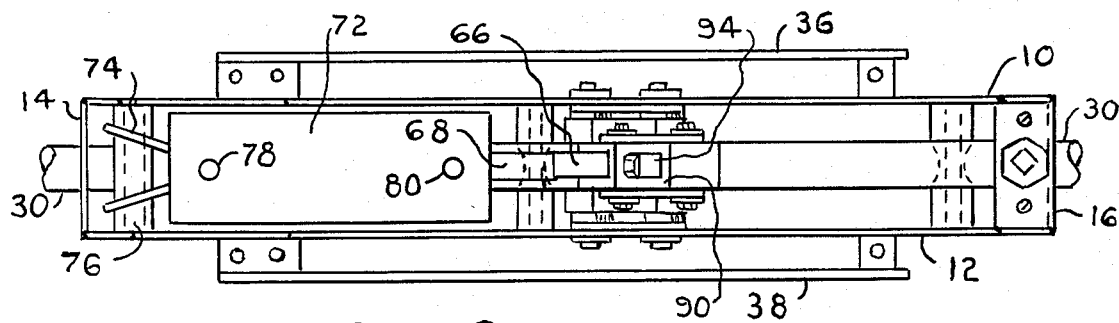
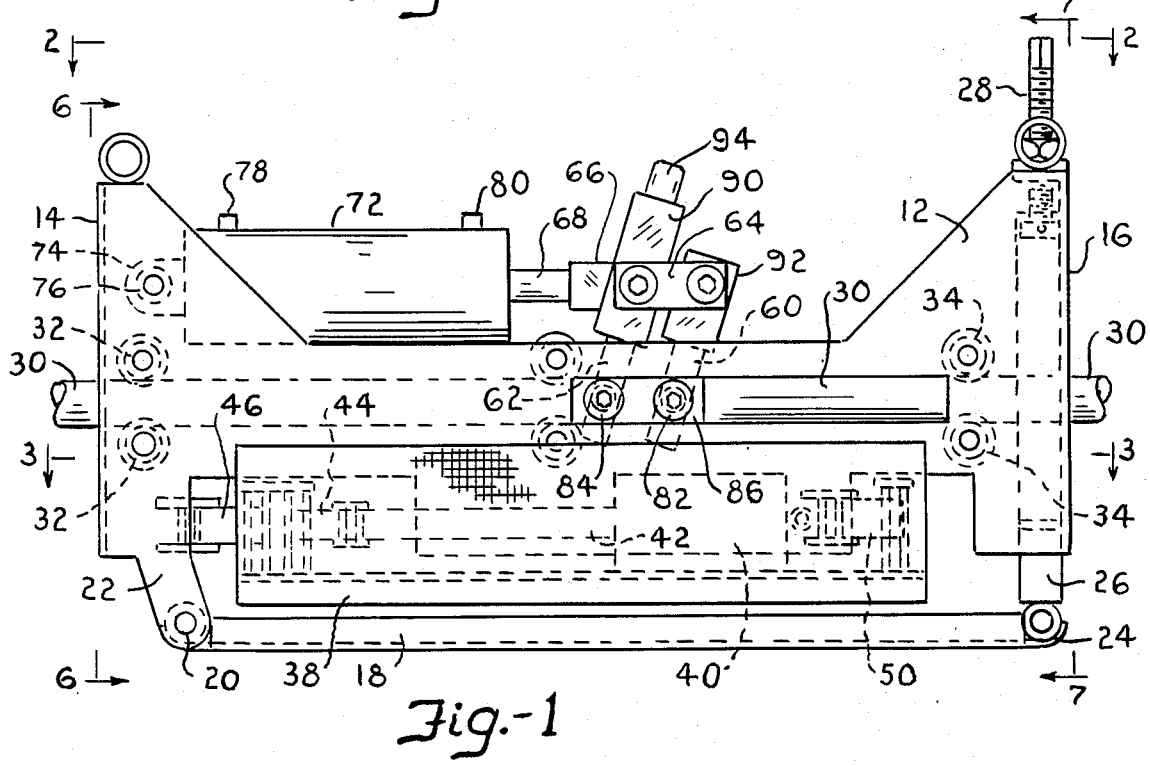

LIGHT WEIGHT UNDERGROUND PIPE OR CABLE INSTALLING DEVICE

BACKGROUND OF THE PRESENT INVENTION

Heretofore it has been customary to employ laterally movable gates positioned above the so-called actuating rod to clamp the device in the operating trench so that sufficient axially directed forces can be exerted on the actuating rod to drive it through the ground to the target trench on the opposite side of where the underground pipe or cable is to be installed. The earth above the actuating rod being closer to the normal surface of the ground is softer and is more susceptable to caving in and shifting which misdirects the actuating rod and renders it more difficult to operate.

OBJECTS OF THE PRESENT INVENTION

An object of the present invention is to provide a pair of laterally movable gates positioned adjacent the bottom of a narrow pipe installing device to securely clamp the device in a narrow and deep operating trench so that sufficient axially directed forces can be exerted to push an actuating rod through the earth to a target trench positioned on the opposite side of where the underground pipe or cable is to be installed.

A further object is to provide hydraulically actuated gates positioned adjacent the bottom of a narrow underground pipe installing device to securely clamp the device in an operating trench.

Yet another object of the invention resides in the provision of a single hydraulic cylinder to move a pair of laterally movable gates outwardly to securely clamp a pipe installing device between the banks of an operating trench.

BRIEF DESCRIPTION OF THE DRAWINGS

FIG. 1 is a side elevational view of a pipe installing device embodying the present invention.

FIG. 2 is a top plan view taken on the lines 2—2 of FIG. 1 looking in the direction of the arrows.

FIG. 3 is a sectional view taken on the lines 3—3 of FIG. 1, looking in the direction of the arrows.

DETAILED DESCRIPTION OF A PREFERRED EMBODIMENT

Figure 4:
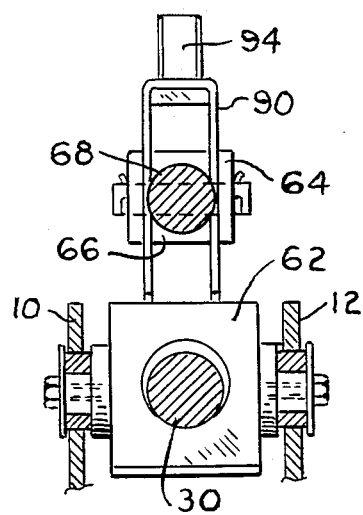
FIG. 4 is a part sectional view of the rod actuating mechanism, taken substantially on the line 4—4 of FIG. 5 looking in the direction of the arrows.
Figure 5:
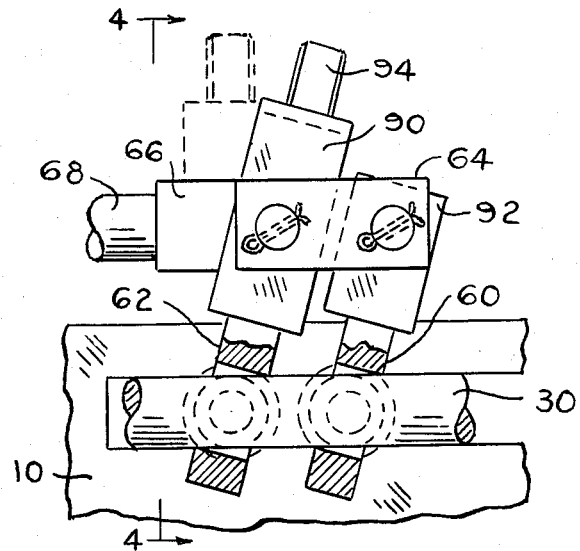
FIG. 5 is an enlarged part-sectional view of the rod actuating mechanism.
Figure 6:
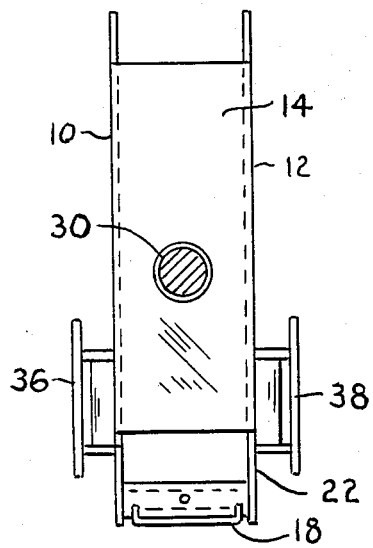
FIGS. 6 and 7 are end elevational views, partly in section taken substantially on the lines 6—6 and 7—7 respectively of FIG. 1, looking in the direction of the arrows.
Figure 7:
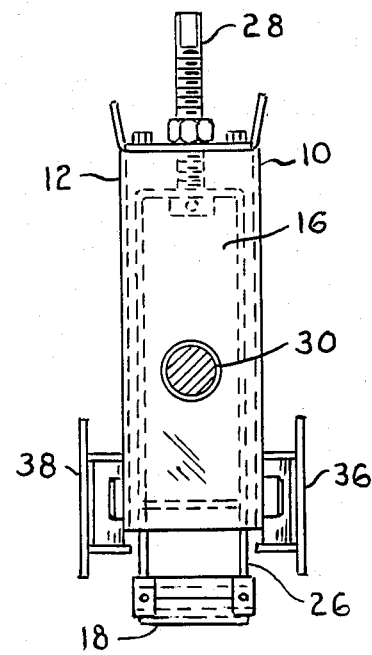

Referring now more particularly to FIGS. 1 to 3 an improved underground pipe and cable installing device adapted to be installed in a narrow operating trench is illustrated. A pair of laterally spaced side plates 10 and 12 are connected together by front and rear end plates 14 and 16. The end plates 14 and 16 are quite short to position the side plates 10 and 12 close together, the spacing between them being only approximately 5½" to permit the positioning of the device in a narrow trench of somewhat less than approximately 6" wide, thereby avoiding the necessity of digging a wide trench to accomodate the device, and rendering it possible to install an underground pipe or cable without unduly disturbing the ground adjacent to where the underground pipe or cable is to be installed.

A bottom support plate 18 is hingedly mounted adjacent one end, such for example as the front end at which the bottom plate 18 is pivoted at 20 in extensions 22 of the side plates 10 and 12. The opposite end 24 of the bottom plate 18 is pivotally mounted to a plunger 26 controlled by a screw threaded member 28 rotatable in a suitable support secured for example to the rear end plate 16 so that the device can be adjusted angularly in the trench to vary the vertical inclination of an actuating rod 30 suitably secured between pairs of front and rear rollers 32 and 34.

The underground pipe installing device may be securely clamped in the operating trench by means of laterally movable gates 36 and 38 adapted to be moved outwardly to securely clamp the device in the bottom area of the operating trench. The earth of the side walls near the bottom of the operating trench is much firmer than is the earth near the upper areas of the operating trench, and will therefore clamp the device more firmly to prevent shifting which could cause the operating rod to drift angularly to an undersirable degree to induce the actuating rod 30 to shift from the desired elevation in the target trench or even to miss the target trench completely.

Power means may be employed to shift the laterally movable gates 36 and 38 outwardly to securely clamp the device in the operating trench, and to shift them inwardly to release the device in the trench.

A floating cylinder 40 is preferably positioned between the side plates 10 and 12 near the bottom of the support plate 18, and in alignment with the laterally movable gates 36 and 38.

The outer end of the piston in the cylinder is pivotally connected to the inner ends of links 44, the outer ends of the links 44 being pivotally connected to the gates 36 and 38 near the front end plate 14. A pair of guide links 46 are pivotally connected at their outer ends to the gates 36 and 38 and at their inner ends to a pair of spaced plates 48 bridging the space between the side plates 10 and 12 to act as guides to induce equal outward lateral movement of the gates 36 and 38. The other or rear ends of the gates 36 and 38 are connected by links 50 pivotally connected at their outer ends to the gates 36 and 38, and at their inner ends to a plate 52 fixed to the outer end of the cylinder 40 and bridging the space between the side plates 10 and 12.

In operation when hydraulic fluid under pressure is injected into the cylinder 40 through the fluid inlet 54 the piston in the cylinder 40 is shifted towards the left as viewed in FIG. 3 to move the piston rod 42 towards the left and the cylinder 40 toward the right to increase the angularity of the links 50 and 44 and the guide links 46 to shift the gates 36 and 38 outwardly to firmly engage the banks of the operating trench to securely clamp the device in the operating trench.

When the end of the connected up actuating rod 30 emerges in the target trench, and the pipe or cable to be installed in the hole made by the actuating rod 30 has been installed, the gates 36 and 38 of the underground pipe installer may be released from the banks of the operating trench. To release the gates the valve controlling the flow of pressurized fluid to the cylinder 40 is reversed to release fluid pressure through the fluid inlet 54 and to inject fluid under pressure to the fluid inlet 56 to telescope the piston and piston rod 42 in the cylinder 40 to reduce the angularity of the links 44, 46 and 50 and forcibly move the gates 36 and 38 inwardly to release the gates from the walls of the operating trench.

To accomodate the gates 36 and 38 at the bottom of the pipe installing device so that the device can be installed at the bottom of a narrow operating trench it is necessary that jaws to engage and grip the actuating rod 30 be positioned above the gates and the actuating rod 30.

To engage the rod 30 with a sufficiently firm grip it is desirable that two jaws engage the rod so as to exert sufficient gripping force on the rod to move it longitudinally from the operating trench to the target trench without exerting so much radial or compressive force in one area of the rod 30 as to crush it.

The rod 30 may be engaged by two spaced jaws 60 and 62 positioned in flat members having apertures through which the rod 30 projects, and having bevelled side edges to engage the upper and lower surfaces of the rod 30. The jaws 60 and 62 are interconnected by means of plates 64 on opposite sides of the jaw members 60 and 62 and to a clevis 66 secured to a piston rod 68 connected to a piston slidably mounted in a cylinder 72, one end of which is connected through links 74 welded or otherwise secured to a plate 76 secured to the side plates 10 and 12. The cylinder 72 is provided with spaced fluid inlets 78 and 80 to admit fluid under pressure into one end of the cylinder 72 and to permit the escape of fluid at the other end of the cylinder 72.

The jaw members 60 and 62 are guided by rollers 82 and 84 received within aligned slots 86 in the side plates 12 and 10 respectively. The jaw members 62 and 60 have upstanding substantially square heads 90 and 92 engaged by the plates 64. The head 90 has an upstanding fitting of substantially square configuration 94 to permit it to be engaged by a long handled wrench whereby the jaws 60 and 62 may be actuated to reverse the direction of travel of the actuating rod 30 as the hydraulic unit consisting of the cylinder 72 is moved back and forth to move the rollers 82 and 84 in the slot 86.

The operation is as follows. An operating trench which may be as narrow as 5¾" wide and three to four feet deep is dug at the point where it is desired that the underground pipe or cable be installed.

The underground pipe installer is then positioned in the trench, and the screw threaded member 28 is actuated to vary the elevation of the device on the bottom of the support plate 18 to provide the desired elevation so that the actuating rod will emerge at the desired elevation in the target trench.

The laterally movable gates 36 and 38 are then shifted outwardly by operation of the fluid pressure system in the cylinder 40 to firmly engage the gates 36 and 38 with the side walls of the operating trench beneath the actuating rod 30 to securely clamp the device in the trench.

A rod segment 30 approximately three feet long is then driven into the ground at the end of the operating trench and between the operating trench and the target trench by operation of the fluid pressure system including the cylinder 72. When that rod segment has been installed another short rod segment should be added, for example by the use of my improved underground pipe installer as disclosed in my copending application Ser. No. 404,428 filed Aug. 2, 1982 (W-2495) or otherwise. The rod driving mechanism is actuated to progressively drive each of the rod segments into the ground until the rod 30 emerges in the target trench at the other side of where it is desired to install the pipe or cable.

When the rod 30 emerges in the target trench the cap at the end of the first rod segment 30 is removed, and an adapter connector such as that disclosed in my U.S. Pat. No. 4,318,639 issued Mar. 9, 1982 (W-2353) is applied to connect the pipe or cable to be installed to the end of the rod 30. The position or the jaws 60 and 62 are then reversed by actuation of the contoured end 94 of the head 90 by a wrench. The operation of the fluid pressure system including the cylinder 72 is then continued to move the actuating rod in the reverse direction to pull the pipe or cable into the underground hole previously established by the rod 30.

When the pipe or cable to be installed emerges in the operating trench the operation is then complete, and the pipe or cable is released from the coupler. The laterally movable stabilizing gates 36 and 38 are then retracted by the reversal of the fluid pressure actuated means including the cylinder 40 whereupon the underground pipe installing device may be removed from the operating trench.

I claim:

1. An underground pipe installer device adapted to be positioned in a narrow and deep operating trench and having reciprocating drive jaws to tightly engage an actuating rod consisting of a plurality of rigid rod sections coupled in end to end arrangement and to move said actuating rod longitudinally to form an underground hole between two spaced points comprising a rectangular framework having closely spaced apart side plates connected by front and rear end plates, front and rear guide rollers for the actuating rod, laterally movable elongated gates positioned adjacent the bottom of the framework beneath the guide rollers for the actuating rod and adapted in a retracted position to lie parallel and substantially flush with the side plates, and in an extended position to project outwardly from the parallel to the side plates to engage the walls of the narrow and deep operating trench beneath the actuating rod to clamp the pipe installer device in the trench, fluid pressure operated means to actuate the gates, a support plate hingedly mounted relative to the framework to vary the angular inclination of the actuating rod, drive jaws to engage the actuating rod, said drive jaws being positioned above the actuating rod, and fluid pressure operated means positioned above the actuating rod to actuate the drive jaws and to project the actuating rod longitudinally between said two spaced points.

* * * * *